(12) United States Patent
Unkel et al.

(10) Patent No.: US 8,325,757 B2
(45) Date of Patent: Dec. 4, 2012

(54) DE-ENCAPSULATION OF DATA STREAMS INTO MULTIPLE LINKS

(75) Inventors: Christopher Unkel, Palo Alto, CA (US);
Edwin C. Seim, Campbell, CA (US);
Lawrence L. Butcher, Mountain View, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 243 days.

(21) Appl. No.: 12/873,124

(22) Filed: Aug. 31, 2010

(65) Prior Publication Data
US 2011/0150006 A1 Jun. 23, 2011

Related U.S. Application Data

(60) Provisional application No. 61/287,671, filed on Dec. 17, 2009.

(51) Int. Cl.
*H04J 3/16* (2006.01)
*H04J 3/06* (2006.01)

(52) U.S. Cl. ............... 370/465; 370/503; 375/240.28

(58) Field of Classification Search ............ 370/465, 370/466, 474, 503; 375/240.02, 240.28
See application file for complete search history.

(56) References Cited

U.S. PATENT DOCUMENTS

| 5,392,071 A | | 2/1995 | Richards et al. | |
|---|---|---|---|---|
| 5,764,301 A | * | 6/1998 | Chapel | 348/537 |
| 5,771,329 A | * | 6/1998 | Yun | 386/291 |

(Continued)

FOREIGN PATENT DOCUMENTS

WO WO-0130088 4/2001

OTHER PUBLICATIONS

International Search Report and Written Opinion for PCT Patent Application No. PCT/US2010/060331, Mailed Sep. 16, 2011, 9 Pages.

(Continued)

*Primary Examiner* — Andrew Lee
(74) *Attorney, Agent, or Firm* — Blakely Sokoloff Taylor & Zafman LLP

(57) ABSTRACT

Embodiments of the invention are generally directed to de-encapsulation of data streams into multiple links. An embodiment of a method includes receiving a data stream including multiple data frames, the data stream being in a first mode having a multiple channels of content data including a first channel sent in a first position in each data frame and a second channel sent in a second position in each data frame following the first position, with each data frame including a synchronization signal to indicate a start of the content data. The method further includes transforming the data stream into data sub-streams in a second mode, the data sub-streams including a first data sub-stream to carry data for the first channel in the second mode and a second data sub-stream to carry data for the second channel in the second mode. Transforming the data stream into in the plurality of data sub-streams includes generating the first data sub-stream by stripping the second channel from each frame of data, and generating the second data sub-stream by stripping the first channel and the synchronization signal from each frame and inserting a substitute synchronization signal before the second channel data in each data frame. The method further includes transmitting the first data sub-stream via a first link in the second mode and the second data sub-stream via a second link in the second mode.

27 Claims, 11 Drawing Sheets

U.S. PATENT DOCUMENTS

| | | |
|---|---|---|
| 6,185,339 B1 | 2/2001 | Ozaki |
| 6,198,822 B1 * | 3/2001 | Doyle et al. .................. 380/210 |
| 6,366,623 B1 * | 4/2002 | Dupuy .......................... 375/340 |
| 2006/0015919 A1 | 1/2006 | Karppinen et al. |
| 2009/0110370 A1 * | 4/2009 | Shibata ........................ 386/102 |
| 2010/0172379 A1 * | 7/2010 | Guignard et al. ............. 370/503 |
| 2011/0064373 A1 * | 3/2011 | Doser et al. .................. 386/201 |
| 2012/0008044 A1 * | 1/2012 | Nagata et al. ................. 348/478 |

OTHER PUBLICATIONS

Hitachi Ltd. et al., "High-Definition Multimedia Interface Specification Version 1.4", HDMI Licensing, LLC, Jun. 5, 2009, 425 pp.

\* cited by examiner

DE-ENCAPSULATION OF DATA STREAMS INTO MULTIPLE LINKS

TECHNICAL FIELD

This U.S. patent application claims priority to and incorporates by reference the corresponding U.S. Provisional Patent Application Ser. No. 61/287,671, entitled "De-Encapsulation of Data Streams into Multiple Links", filed on Dec. 17, 2009.

TECHNICAL FIELD

Embodiments of the invention generally relate to the field of data communications and, more particularly, de-encapsulation of data streams into multiple links.

BACKGROUND

In certain networks, content data may be transmitted over a data link between a first device and a second device in various transmission formats. For example, the content may represent video and audio data, and thus may include video data that is transmitted in a certain format.

In an example, a data stream may be in the form of multiple channels. For example, data may include a data stream of video and audio data or other content data sent from a first device to second device, where the content data includes multiple data channels encapsulated in a three-dimensional (3D) format that includes a left channel and a right channel. For example, the data may be in the form of HDMI 1.4 3D video. (High Definition Multimedia Interface 1.4 Specification, issued May 28, 2009).

However, a receiving device may not be capable of recognizing the multiple channel format. For example, a receiver within a receiving device may only be capable of handling data in a single channel format, which may be referred to herein as a mono (or two-dimensional (2D)) format.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
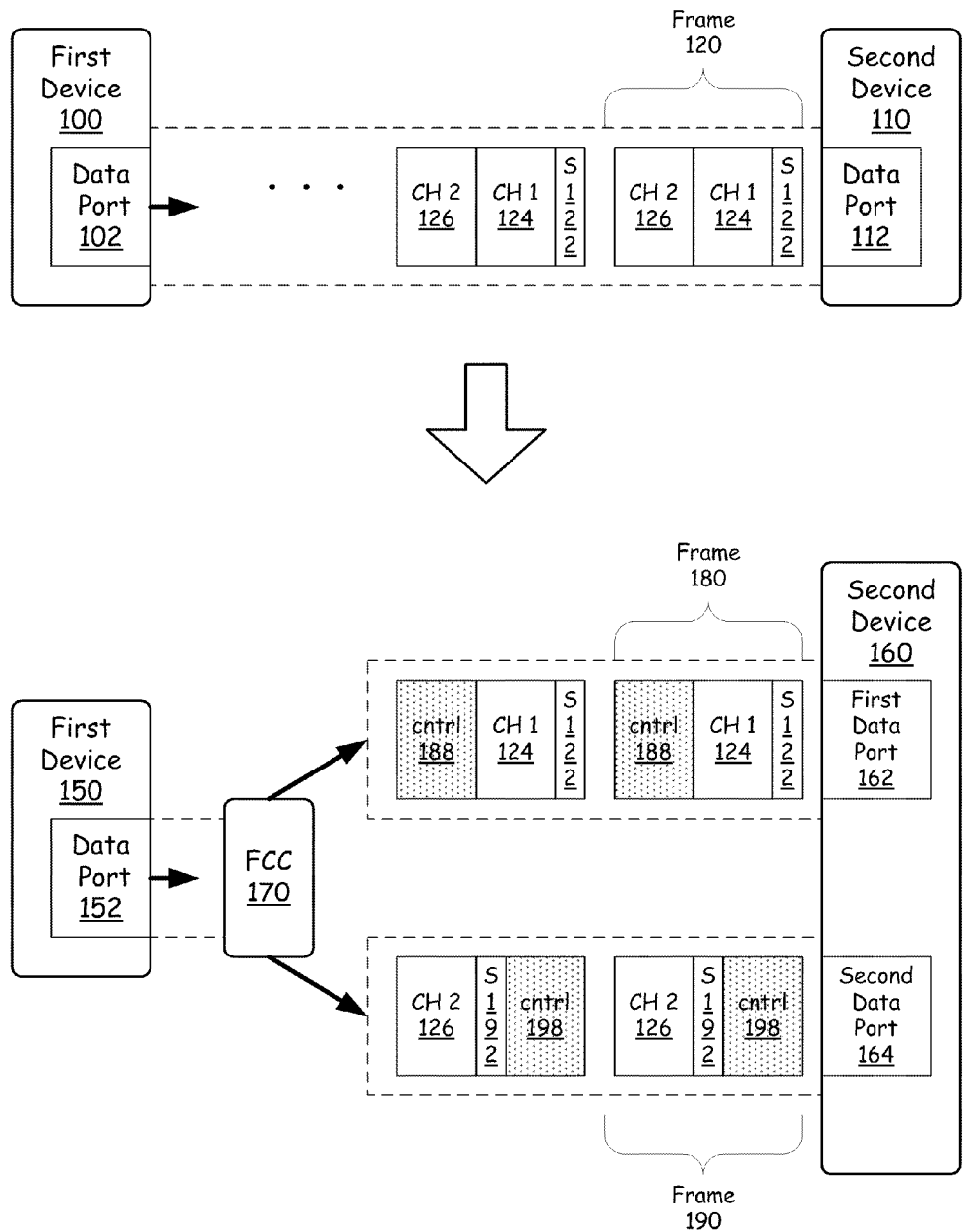
FIG. 1 is an illustration of an embodiment of transmission of data between devices.

Embodiments of the invention are generally directed to de-encapsulation of data streams into multiple links.

In a first aspect of the invention, a method includes receiving a data stream including multiple data frames, the data stream being in a first mode having multiple channels of content data including a first channel sent in a first position in each data frame and a second channel sent in a second position in each data frame following the first position, with each data frame including a synchronization signal to indicate a start of the content data. The method further includes transforming the data stream into data sub-streams in a second mode, the data sub-streams including a first data sub-stream to carry data for the first channel in the second mode and a second data sub-stream to carry data for the second channel in the second mode. Transforming the data stream into the plurality of data sub-streams includes generating the first data sub-stream by stripping the second channel from each frame of data, and generating the second data sub-stream by stripping the first channel and the synchronization signal from each frame and inserting a substitute synchronization signal before the second channel data in each data frame. The method further includes transmitting the first data sub-stream via a first link in the second mode and the second data sub-stream via a second link in the second mode.

In a second aspect of the invention, an embodiment of an apparatus includes an input port to receive a data stream of data frames, the data stream being in a first mode having multiple channels of content data including a first channel sent in a first position in each data frame and a second channel transmitted in a second position in each data frame following the first position, and each data frame including a synchronization signal indicating a start of the content data. The apparatus further includes a memory to hold data for processing, a first output port to provide a first data sub-stream to carry data for the first channel in the second mode, a second output port to provide a second data sub-stream to carry data for the second channel in the second mode; and a processing unit to process the data packets, where the processing of the data by the processing unit includes generating the first data sub-stream by stripping the second channel from each frame of data, and generating the second data sub-stream by stripping the first channel and the synchronization signal from each frame and inserting a substitute synchronization signal before the second channel data in each data frame.

DETAILED DESCRIPTION

Embodiments of the invention are generally directed to de-encapsulation of data streams into multiple links.

In some embodiments, a system may provide for de-encapsulation of a data stream containing multiple channels into multiple data sub-streams to be transmitted via separate links. In some embodiments, a first device may transmit a stream of content data to a second device, the stream of data being a stream of multi-channel data, such as, for example, three-dimensional data. The data stream may include, for example, audio/video data, including HDMI™ (High-Definition Multimedia Interface) data and MHL™ (Mobile HD Link) data, where HDMI and MHL provide audio/video interfaces for transmitting uncompressed digital data. The data may be encrypted prior to transmission, such as encryption utilizing HDCP™ (High Bandwidth Digital Content Protection).

HDMI may be described by the provisions of HDMI specifications, including "High-Definition Multimedia Interface", Version 1.4, released May 28, 2009, and other earlier and later issued documents. MHL may be described by the provisions of MHL specifications. HDCP may be described in "High-bandwidth Digital Content Protection System" Revision 1.3, released Dec. 21, 2006 and other earlier and later issued documents.

In some embodiments, a method, apparatus, or system may provide for transformation of the data stream into multiple data sub-streams, each data sub-stream representing one of the channels of the original data. For example, the data stream may be composed of a stream of data packets, where each data packet includes multiple channels of content data, such as, for example, left and right channels of 3D data. An apparatus may be intended to transfer such data to a receiving apparatus, where the receiving apparatus may include one or more receivers that are capable of mono (2D) data reception and are not capable of 3D data reception. In some embodiments, the 3D data stream is transformed or de-encapsulated into multiple mono data sub-streams for reception by multiple non-3D enabled receivers. In some embodiments, the data from data sub-streams is combined to generate a multi-channel result, such as a 3D image generated from multiple mono data sub-streams. In some embodiments, the data sub-streams may be unrelated data sub-streams that shared the common encapsulation of the original data stream.

FIG. 1 is an illustration of an embodiment of transmission of data between devices. In this illustration, a first device 100 with a data port 102 is communicatively coupled with a second device 110 with data port 112. The first device 100 transmits a data stream composed of multiple frames of data to the second device 110. In FIG. 1 each frame of data 120 includes a synchronization signal or indication 122 followed by multiple channels of data encapsulated into such data frame, such as data for a first channel 124 and data for a second channel 126. The data may include video data, such as 3D HDMI video data. However, in this arrangement the second device 110 would be required to receive and handle 3D data. In some embodiments, the data stream is annotated to indicate that the data frames contain 3D data. In some embodiments, the data for the first channel 124 and the data for the second channel may comprise unrelated data streams.

In some embodiments, the data transmission is transformed to allow a receiving device, or multiple receiving devices, to receive the multiple channels of the data stream separately. In this illustration, a first device 150 having data port 152 is communicatively coupled with an apparatus to de-encapsulate the data stream into multiple data sub-streams to be transmitted over multiple links, the apparatus being illustrated as a format conversion chip 170 that is communicatively coupled with a second device 160 having a first data port 162 for the receipt of a first data sub-stream and a second data port 164 for the receipt of a second data sub-stream. While the first and second data ports are illustrated as being part of a single apparatus in this illustration, in other embodiments there may be separate elements containing the data ports.

As illustrated, the first data port 162 receives data frames 180 including the synchronization signal 122 and first channel data 124 followed by control data/null data 188 that has been substituted for the second channel data 126. The second data port 164 receives data frames 190 that include control data/null data 198 that has been substituted for the synchronization signal 122 and first channel data 124, followed by a substitute synchronization signal 192 and the second channel data 126. In some embodiments, the first and second data sub-streams are modified to indicate that such sub-streams contain mono data, where such modification may include removing the 3D annotation of the original data stream or replacing such annotation with an annotation indicating mono data transmission.

Figure 2:
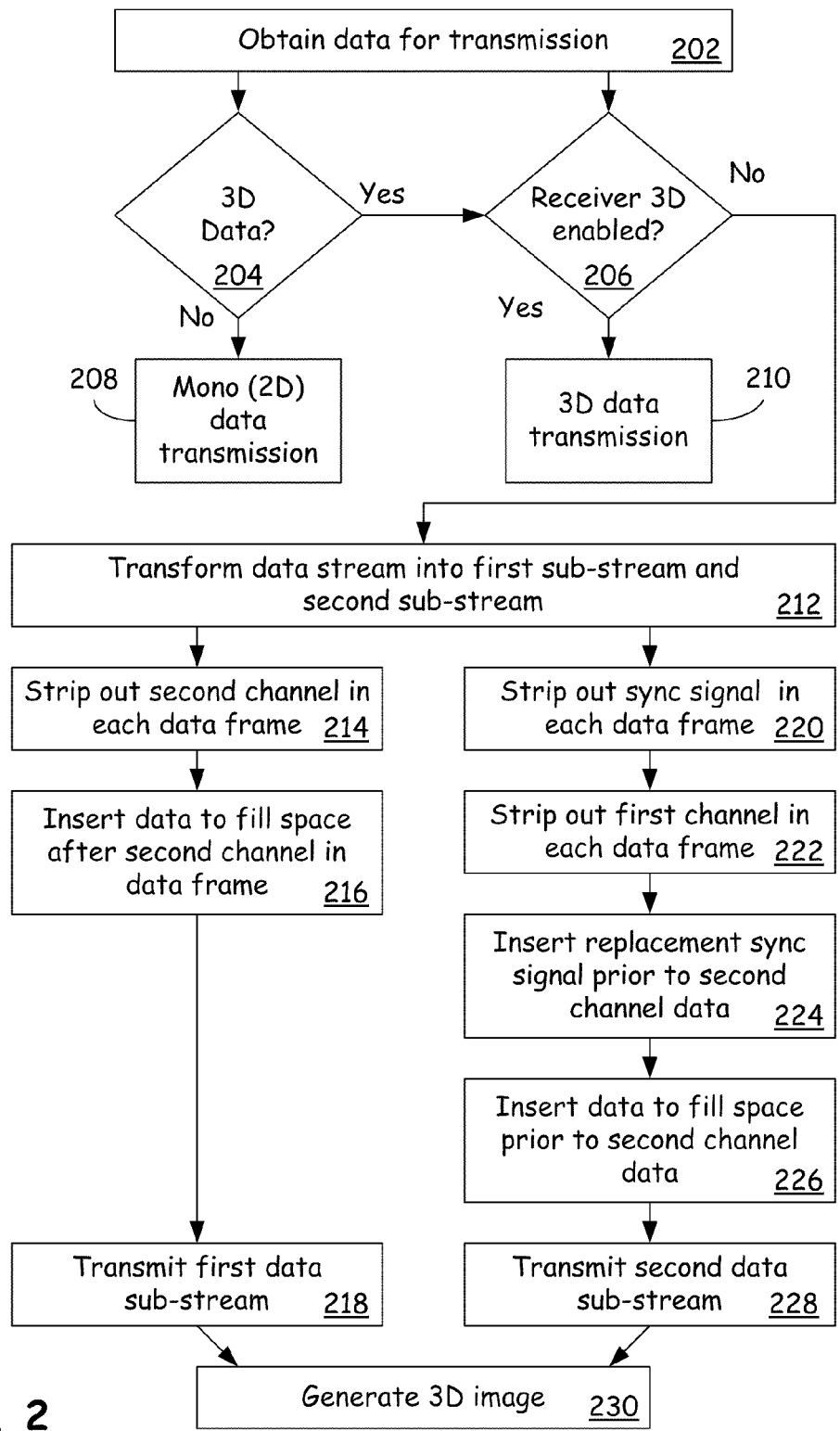
FIG. 2 is a flow chart to illustrate a process for the transmission of data.

FIG. 2 is a flow chart to illustrate a process for the transmission of data. As shown, data, such as video data, is obtained from transmission from a source 202. If the data is not 3D data 204, then a mono data transmission 208 may follow. If the data is 3D data 204 and the intended receiving device includes a 3D enabled receiver 206, then a 3D data transmission 210 may follow. In some embodiments, if the data to be transmitted is 3D and the receiver is not 3D enabled, then the data is transformed into a first date sub-stream and a second data sub-stream 212 to be transmitted over multiple links. While this matter is illustrated as transforming a data stream into first and second data sub-streams, embodiments of the invention are not limited to any particular number of sub-streams, and may include additional sub-streams.

In some embodiments, a process for generating the first data sub-stream may include in each data frame stripping out second channel data 214, and inserting data to fill the space after the first channel data 216. In some embodiments, a process for generating the second data stream may include in each data frame stripping out the synchronization signal 220, stripping out the first channel data 222, inserting a replacement synchronization signal prior to the remaining second channel data 224, and inserting data to fill the space prior to the beginning of data 226. In some embodiments, a process may further include transmitting the first data sub-stream 218 and transmitting the second data sub-stream 228, and generating a 3D image or other combined data element based on the first data sub-stream and the second data sub-stream 230.

Figure 3:
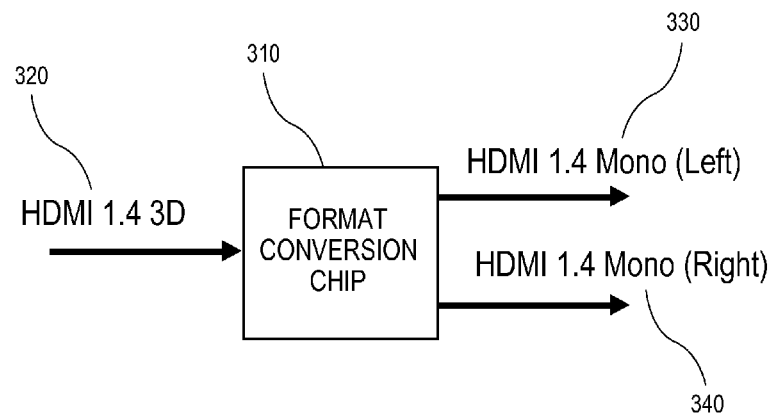
FIG. 3 is an illustration of an input and outputs of an embodiment of a format conversion chip.

FIG. 3 is an illustration of an input and outputs of an embodiment of a format conversion chip. In some embodiments, a format conversion apparatus or element may include a format conversion chip 310, such as a system on a chip (SOC). A format conversion chip 310 may be a separate apparatus or element, or may be a part of a transmitting apparatus or element or receiving apparatus or element. In some embodiments, the format conversion chip 310 receives an HDMI 3D data stream including 3D video data 320, and produces two outputs. The first output is a first HDMI mono (or 2D) data sub-stream 330, such as the left channel data, to transmitted via a first link. The second output is a second HDMI mono data sub-stream 340, such as the right channel data, to be transmitted via a second link.

Figure 4:
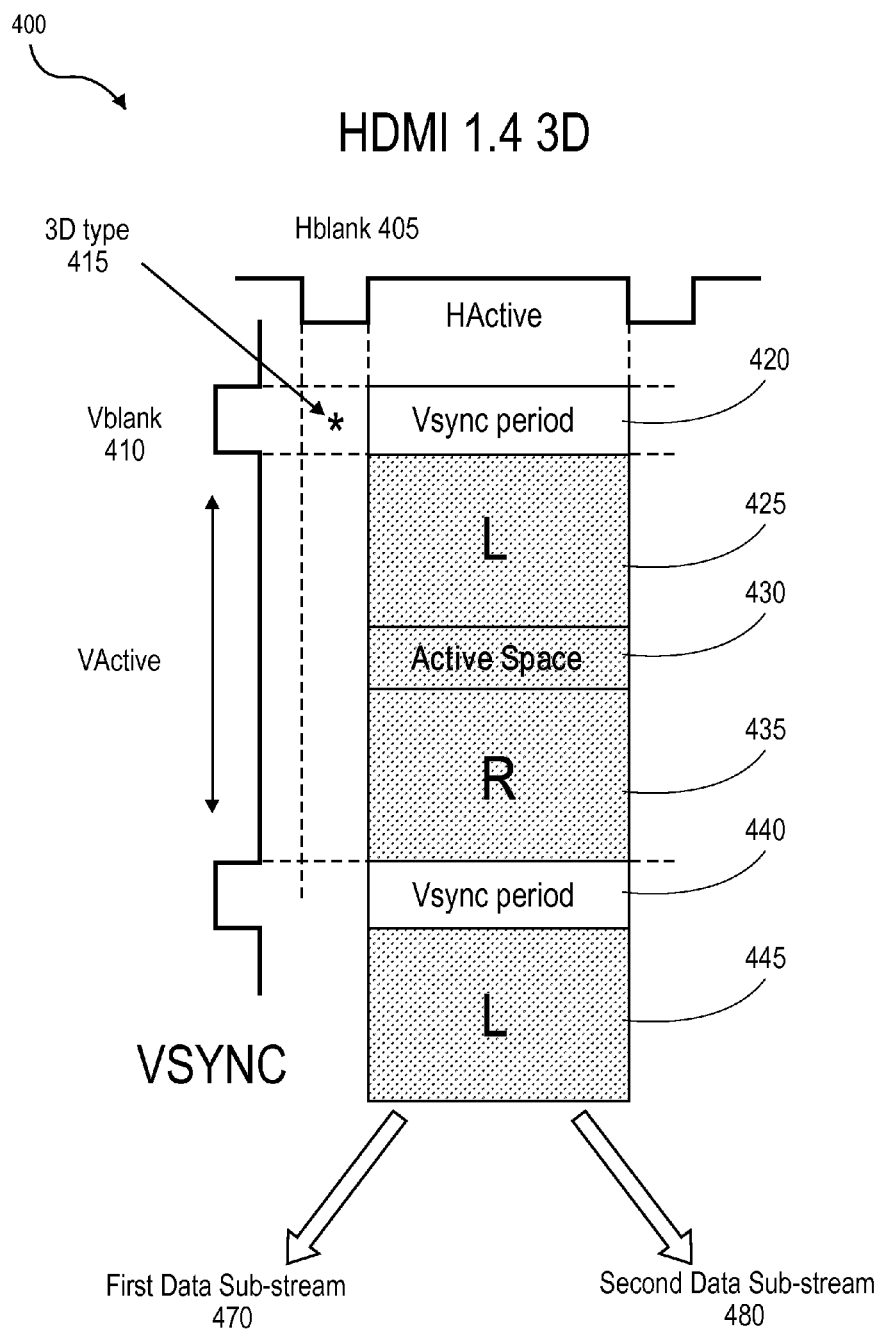
FIG. 4 is an illustration of three-dimensional data frames to be transformed into mono data frames.

FIG. 4 is an illustration of three-dimensional data frames to be transformed into mono data frames. In this illustration, a data frame 400, such as an HDMI 1.4 3D data frame, is shown. In some embodiments, the data frame 400 includes a vertical blanking period (Vblank) 410 at the beginning of each set of data (with the remainder of the time being VActive) and a horizontal blanking period (Hblank 405) prior to each line of data (with the remainder of the time being HActive). The data frame 400 may be annotated to include a type of data, which in this illustration is a 3D type signal 415 in the beginning of the Vblank period 410. The Vblank period 410 may include a synchronization signal contained in a Vsync period at the beginning of the data frame 420. Subsequent to the Vsync period are multiple channels of data, illustrated as left channel data 425 and right channel data 435, with an optional active space period 430 being between the left channel data 425 and the right channel data 435. The data frame 400 may then be followed by one or more additional data frames in the data stream, illustrated as a Vsync period 440 and left channel data 445 following the previous data frame 400.

In some embodiments, the data stream including data frame 400 is transformed in to a first data sub-stream 470 representing the left channel data 425 and a second data sub-stream 480 representing the right channel data 435.

Figure 5:
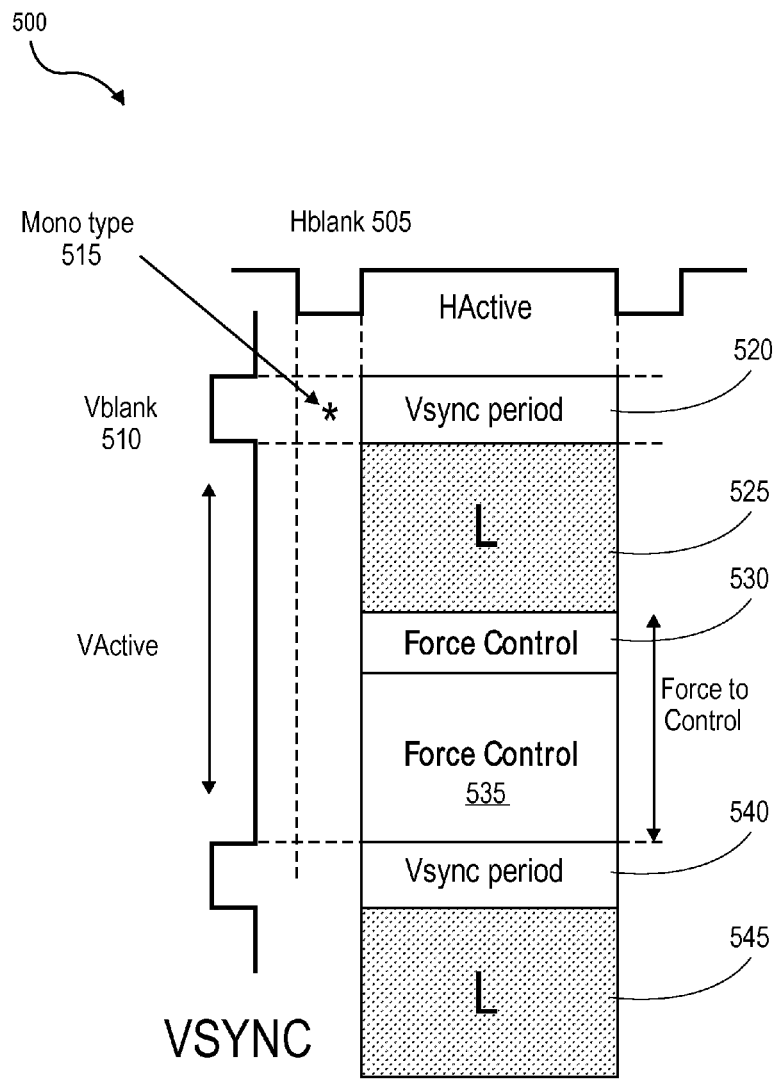
FIG. 5 is an illustration of data frames for a first data sub-stream produced by a format conversion embodiment.

FIG. 5 is an illustration of data frames for a first data sub-stream produced by a format conversion embodiment. In this illustration, a first data sub-stream includes data frame 500, illustrated with Vblank 510 at the beginning of each set of data and Hblank 505 prior to each line of data. In some embodiments, the data frame 500 may be modified or annotated to indicate mono data, such by removing the 3D type signal 415 in FIG. 4 or by replacing such signal with a mono data type signal 515. In some embodiments, a Vsync period 520 with synchronization signal begins the data frame 500, followed by left channel data 525. However, rather than right channel data and an active space period, the left channel data is followed by non-content data inserted to substitute for such data, illustrated as force control data 530 and 535. The data frame 500 may then be followed by one or more additional data frames in the data stream, illustrated as a Vsync period 540 and left channel data 545 following the previous data frame 500.

Figure 6:
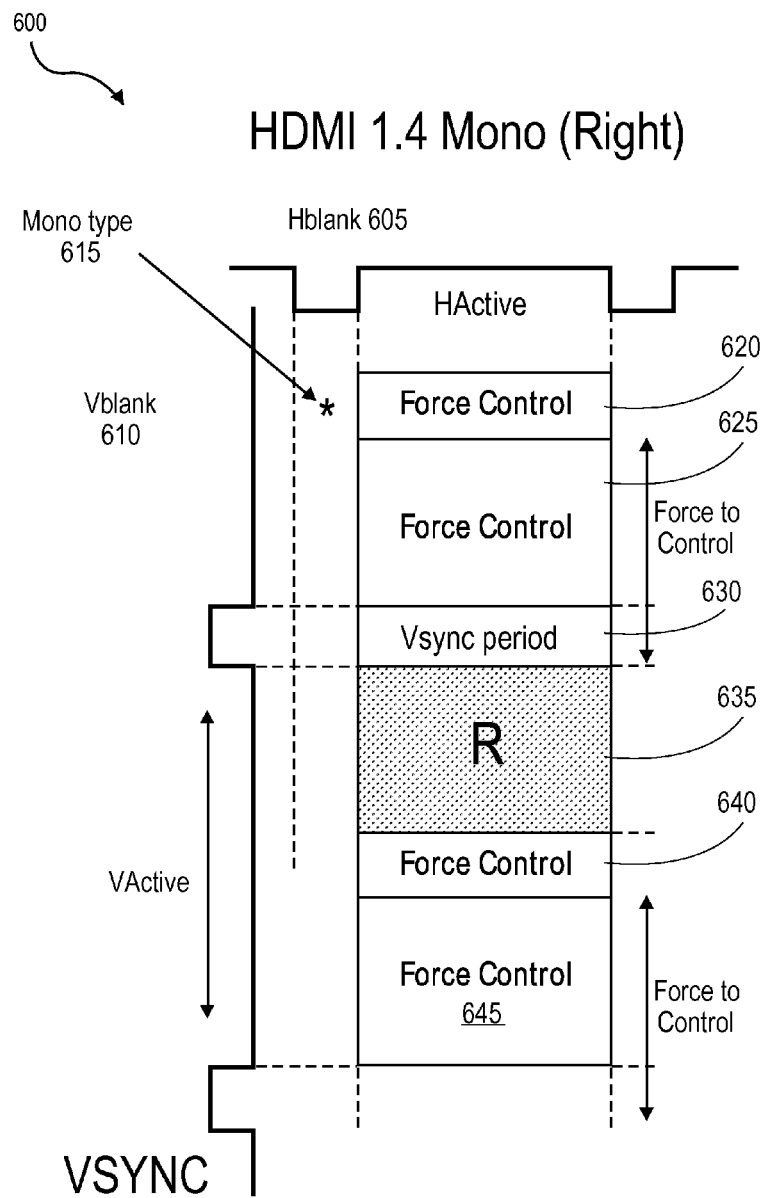
FIG. 6 is an illustration of data frames for a second data sub-stream produced by a format conversion embodiment.

FIG. 6 is an illustration of data frames for a second data sub-stream produced by a format conversion embodiment. In this illustration, a first data sub-stream includes data frame 600, illustrated with Vblank 610 at the beginning of each set of data and Hblank 605 prior to each line of data. Similar to FIG. 5, in some embodiments, the data frame 600 may be modified or annotated to indicate mono data, such by removing the 3D type signal 415 in FIG. 4 or by replacing such signal with a mono data type signal 615. In some embodiments, rather commencing with the synchronization period, the data frame 600 begins with non-content-data, illustrated as force control data 620 and 625 to substitute for the synchronization signal and left channel data provided in the original data frame, such as data frame 400 illustrated in FIG. 4. The non-content data is followed by a substitute vertical synchronization period 630 to provide a synchronization signal, the synchronization period being inserted in the location of the active space 430 of the original data frame 400 in FIG. 4. The substitute synchronization period 630 is followed by the right channel data 635. The data frame 600 may then be followed by one or more additional data frames in the data stream, illustrated as the force control data 640 and 645 for the beginning of the next data frame.

Figure 7:
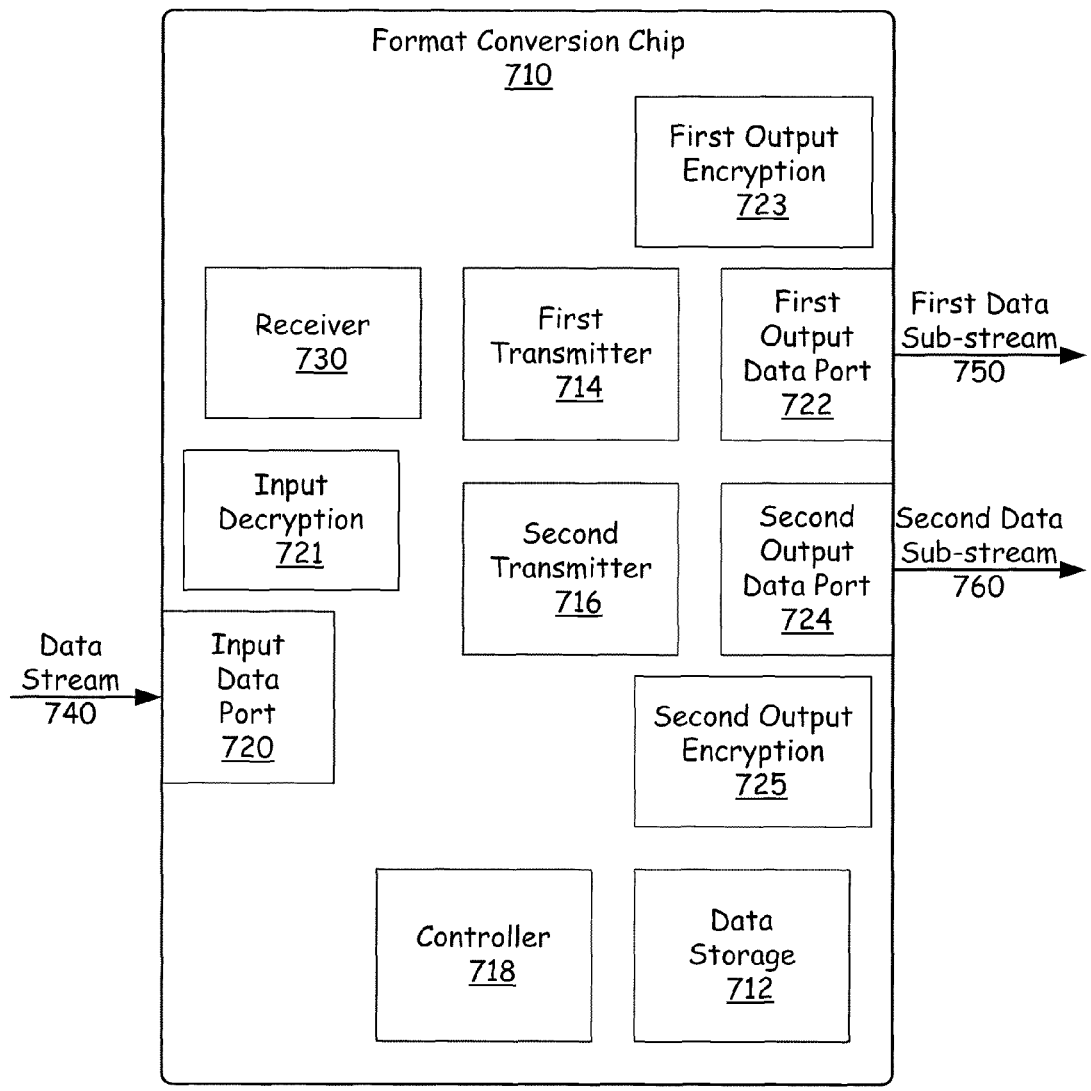
FIG. 7 illustrates an embodiment of a format conversion chip.

FIG. 7 illustrates an embodiment of a format conversion chip. In this illustration, a format conversion apparatus or element is in the form of a format conversion chip 710. However, embodiments are not limited to a computer chip. In this illustration, the format conversion chip 710 includes an input data port 720 for the receipt of a data stream 740 containing multiple channels, such as 3D video data. In some embodiments, the chip 710 includes multiple output data ports for the output of data sub-streams generated from the data stream 740, such as a first output data port 722 to output a first data sub-stream 750 and a second output data port 724 to output a second data sub-stream 760. The format conversion chip 710 may also optionally contain an input decryption block 721 to decrypt received data, and one or more output encryption blocks 723 and 725 to encrypt transmitted data.

In some embodiments, the format conversion chip includes a receiver 730 for the reception of the data stream and one or more transmitters for the transmission of the data sub-streams, such as first transmitter 714 and second transmitter 716. In some embodiments, the format conversion chip further includes a controller or processor 718 for the handling of data, including the generation of the first and second data sub-streams, and a data storage 712 for the storage of data for processing.

Figure 8:
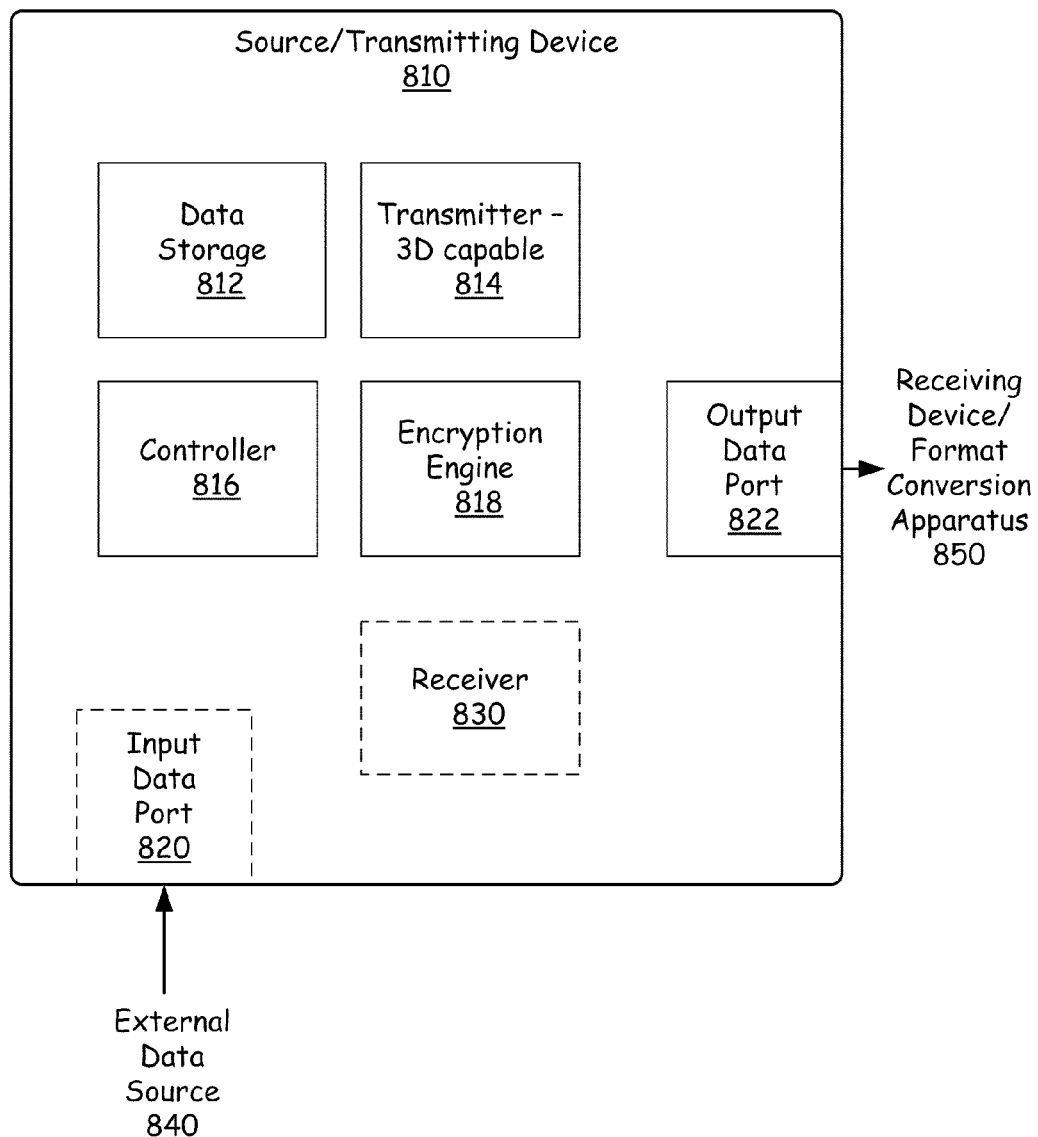
FIG. 8 illustrates an embodiment of a source device in an embodiment of a format conversion system.

FIG. 8 illustrates an embodiment of a source or transmitting device in an embodiment of a format conversion system. In some embodiments, the source device 810 includes an output data port 822 for the output of a data stream containing multiple channels, such as 3D video data, and a transmitter 814 to drive the transmission of the data stream. The output data port 820 may be coupled with a receiving device or with a format conversion apparatus or element 850, which may include the format conversion chip 710 illustrated in FIG. 7. In some embodiments, the source device 810 further includes a controller or processor 816 for the handling of data, which in some embodiments may include the generation of the data streams, and a data storage 812 for the storage of data for transmission or processing. In some embodiments, the source device may include an encryption engine 818 for the encryption of data, and in some embodiments may further include an input data port 820 and receiver 830 for the receipt of data from an external data source 840, such data including data for the generation of the data stream.

Figure 9:
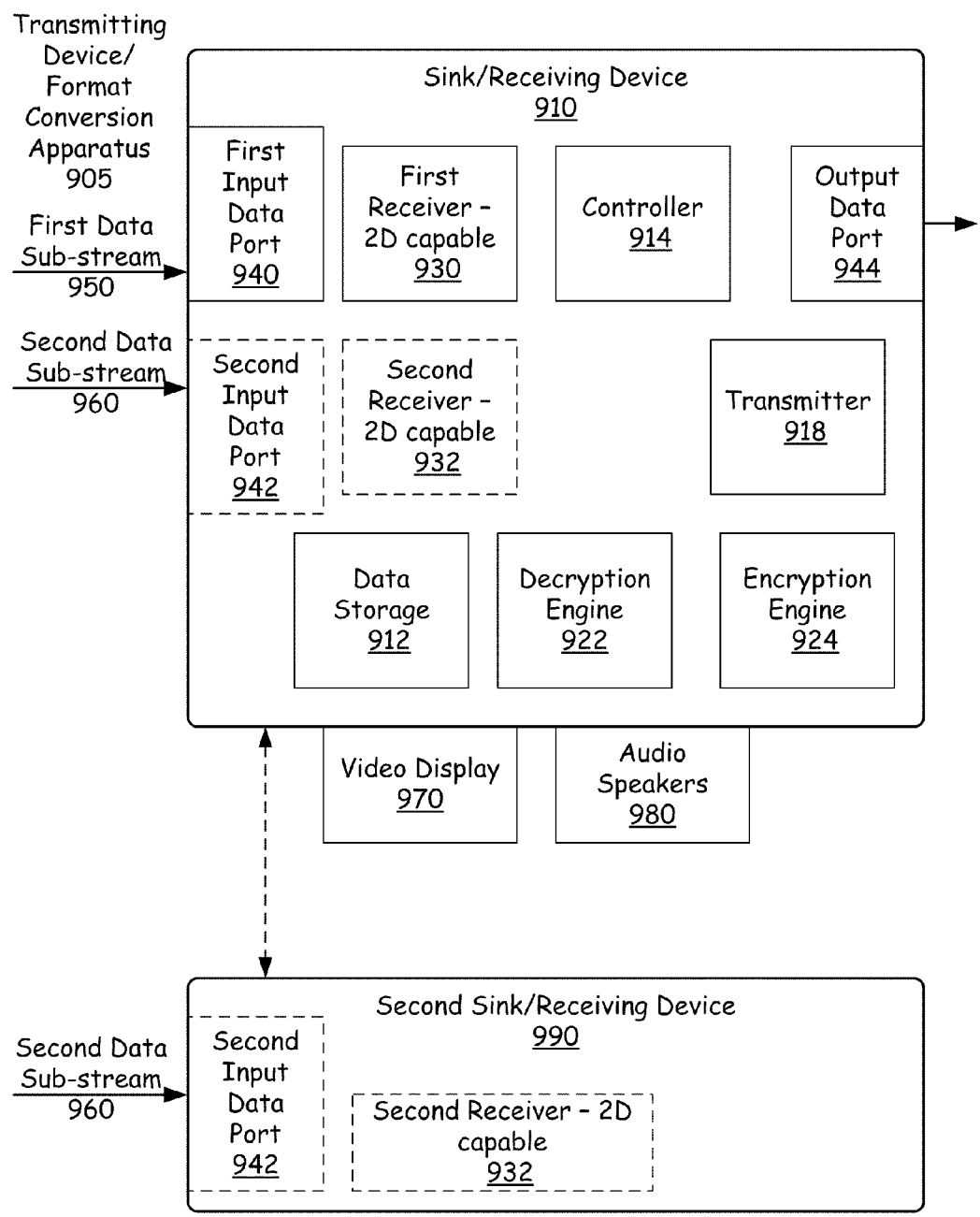
FIG. 9 illustrates an embodiment of a sink or receiving device in an embodiment of a format conversion system.

FIG. 9 illustrates an embodiment of a sink or receiving device in an embodiment of a format conversion system. In some embodiments, the sink device 910 includes one or more input ports for the reception of data, illustrated as a first input data port 940 for the reception of a first data sub-stream 950 and a second data port 942 for the reception of a second data sub-stream 960. Such data may be received from a transmitting device including format conversion or a format conversion apparatus 905. In some embodiments, the sink device 910 may include one or more receivers for receiving the data sub-streams via the input ports, the receivers being illustrated as a first receiver 930 and a second receiver 932.

In some embodiments, the second input data port 942 and second receiver 932 may be contained in a separate device or element, illustrated as second sink/receiving device 990. In some embodiments, the receivers are each mono receivers capable of receiving one channel of data, and thus each receiver is not capable of receiving 3D data or similar multi-channel data on its own. In some embodiments, the data received via the first input data port 940 and the second input data port 942 may be combined to form a complete 3D image or other data presentation.

In some embodiments, the source device 910 further includes a controller or processor 914 for the handling of data, which in some embodiments may include the re-combination of the data received in the first data sub-stream 950 and the second data sub-stream 960, and a data storage 912 for the storage of data for transmission or processing. In some embodiments, the source device may include a decryption engine 922 for the decryption of data received, if necessary. In some embodiments, the sink device may be include or be coupled with presentation devices, such as a video display 970 and audio speakers 980 for the presentation of audiovisual data.

In some embodiments, the sink/receiving device 910 may generate a data output based on the first data sub-stream 950 and the second data sub-stream 960 may transfer the data output to another device. In some embodiments, the device 910 may include an output data port 944 for the output of such data, and a transmitter 918 for the transmission of such data. In some embodiments, the device 910 may include an encryption engine 924 for the encryption of data prior to transmission.

Figure 10:
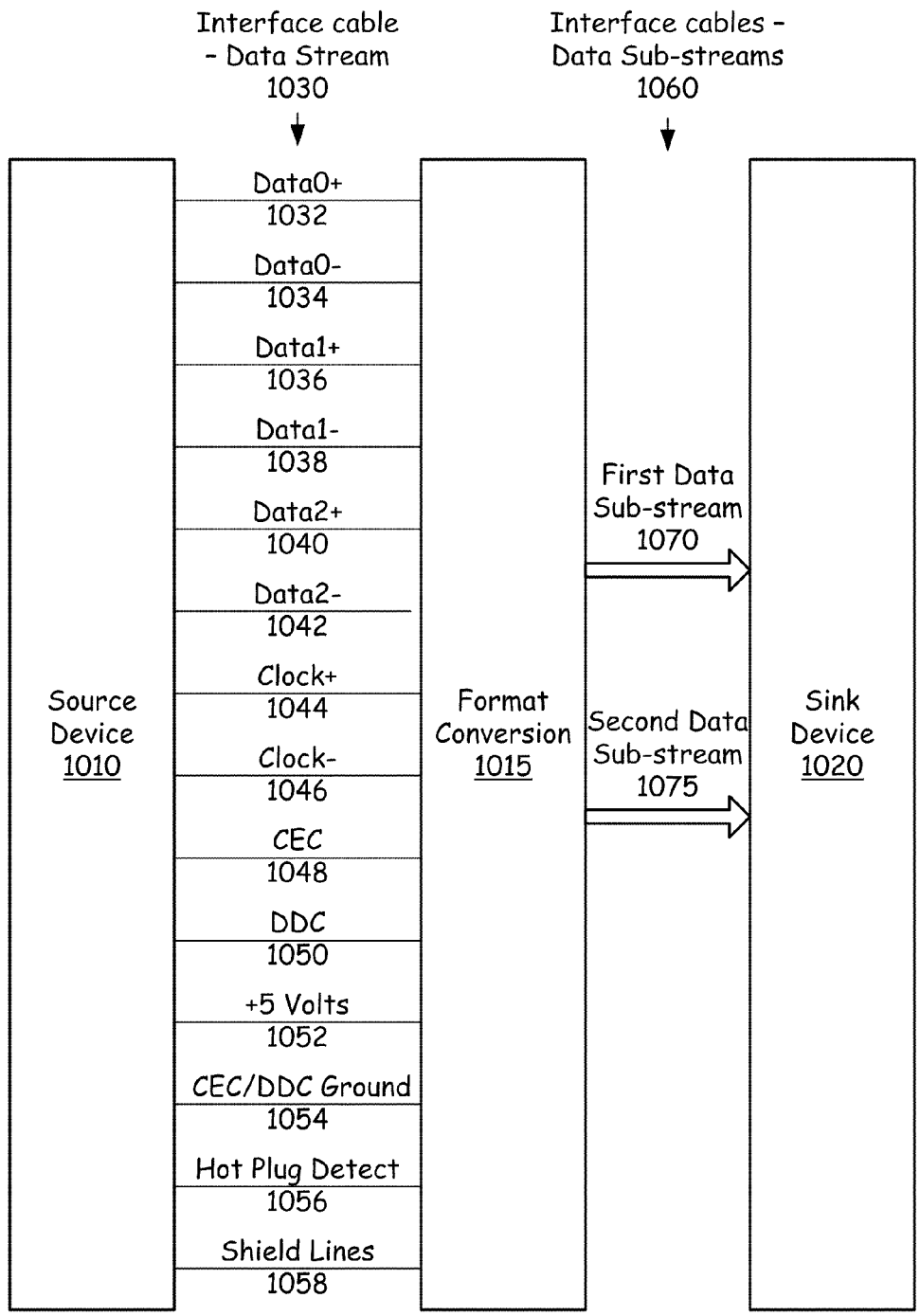
FIG. 10 is an illustration of interfaces in an embodiment of a format conversion apparatus or system.

FIG. 10 is an illustration of interfaces in an embodiment of a format conversion apparatus or system. In some embodiments, a first device may be a source device 1010, a second device a format conversion apparatus or element 1015, and a third device may be a sink device 1020 to utilize received data. In some embodiments, first and second devices 1010-1015 are linked via an interface, such as interface cable 1030, for the transfer of a data stream including a plurality of data frames. The format conversion apparatus or element 1015 then may be linked to the sink device 1020 via multiple interface cables 1060 for multiple interfaces.

In some embodiments, the source device 1010 may transmit a data stream to the format apparatus or element 1015 via cable 1030, with the data stream being a 3D data stream sent as HDMI differential signals via data0+ line 1032, data0− line 1034, data1+ line 1036, data1− line 1038, data2+ line 1040, and data2− line 1042. The cable may further include differential clock lines clock+ 1044 and clock− 1046; Consumer Electronics Control (CEC) control bus 1048; Display Data Channel (DDC) bus 1050; +5 volts power 1052, CEC/DDC ground 1054; hot plug detect 1056; and four shield lines 1058 for the differential signals. In some embodiments, the format conversion apparatus or element 1015 may convert the data stream into multiple data sub-streams representing the multiple channels of the data stream, illustrated as a first data sub-stream 1070 and a second data sub-stream 1080. Each such sub-stream may be transmitted via an interface. In some embodiments, the interface for each data sub-stream may be equivalent to the interface for the data stream including lines 1032-1058.

Figure 11:
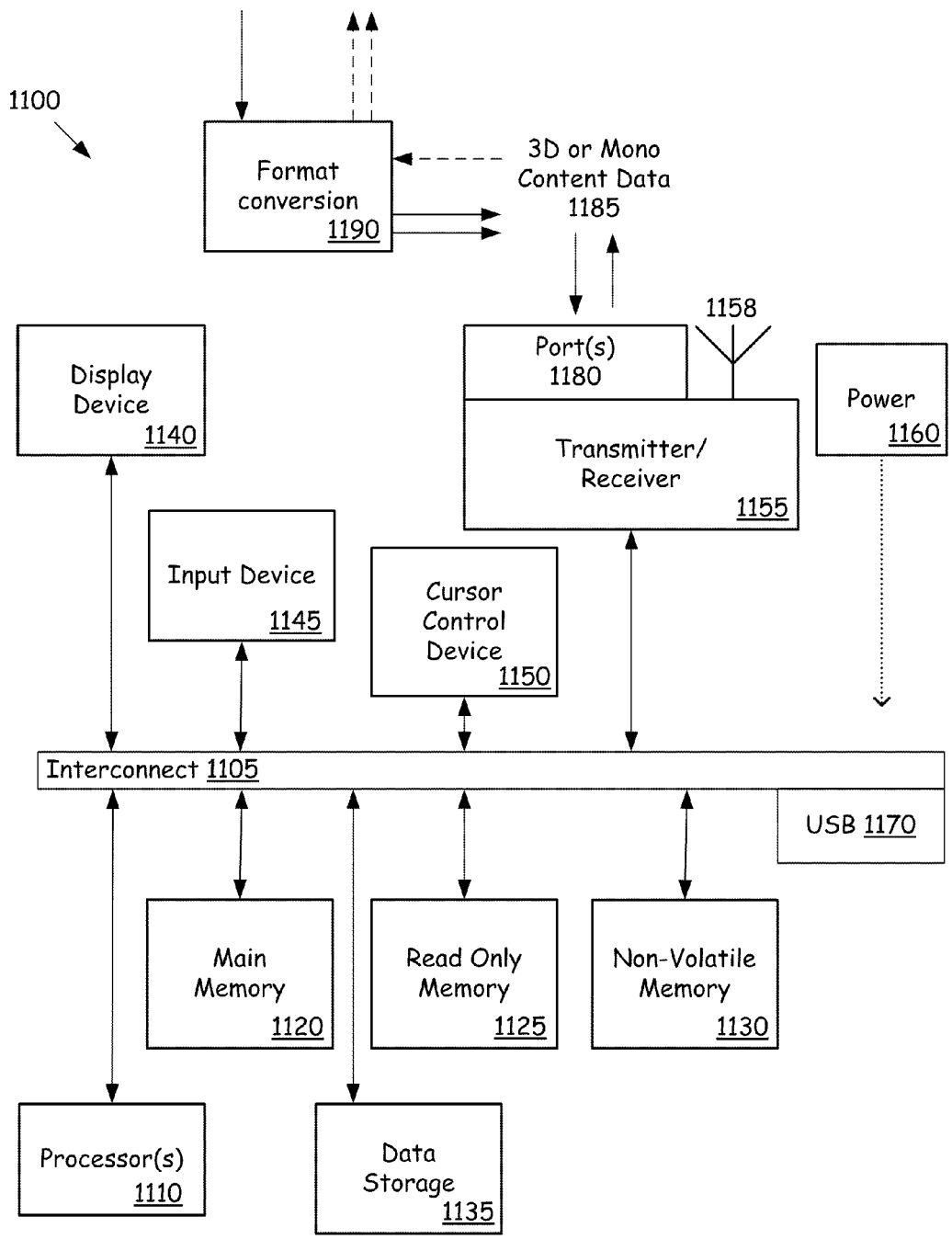
FIG. 11 is an illustration of elements of an apparatus in an embodiment of a format conversion system.

FIG. 11 is an illustration of elements of an apparatus in an embodiment of a format conversion system. In this illustration, certain standard and well known components that are not germane to the present description are not shown. Under some embodiments, a device 1100 may be a source/transmitting device, a sink/receiving device, or both.

Under some embodiments, the device 1100 comprises an interconnect or crossbar 1105 or other communication means for transmission of data. The data may include audio-visual data and related control data. The device 1100 may include a processing means such as one or more processors 1110 coupled with the interconnect 1105 for processing information. The processors 1110 may comprise one or more physical processors and one or more logical processors. Further, each of the processors 1110 may include multiple processor cores. The interconnect 1105 is illustrated as a single interconnect for simplicity, but may represent multiple different interconnects or buses and the component connections to such interconnects may vary. The interconnect 1105 shown in FIG. 11 is an abstraction that represents any one or more separate physical buses, point-to-point connections, or both connected by appropriate bridges, adapters, or controllers. The interconnect 1105 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) The device 1100 further may include a serial bus, such as USB bus 1170, to which may be attached one or more USB compatible connections.

In some embodiments, the device 1100 further comprises a random access memory (RAM) or other dynamic storage device as a main memory 1120 for storing information and instructions to be executed by the processors 1110. Main memory 1120 also may be used for storing data for data streams or sub-streams. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may certain registers or other special purpose memory. The device 1100 also may comprise a read only memory (ROM) 1125 or other static storage device for storing static information and instructions for the processors 1110. The device 1100 may include one or more non-volatile memory elements 1130 for the storage of certain elements.

Data storage 1135 may also be coupled to the interconnect 1105 of the device 1100 for storing information and instructions. The data storage 1135 may include a magnetic disk, an optical disc and its corresponding drive, or other memory device. Such elements may be combined together or may be separate components, and utilize parts of other elements of the device 1100.

The device 1100 may also be coupled via the interconnect 1105 to a display or presentation device 1140. In some embodiments, the display may include a liquid crystal display (LCD), a plasma display, or any other display technology, for displaying information or content to an end user. In some embodiments, the display 1140 may be utilized to display television programming. In some environments, the display 1140 may include a touch-screen that is also utilized as at least a part of an input device. In some environments, the display 1140 may be or may include an audio device, such as a speaker for providing audio information, including the audio portion of a television program. An input device 1145 may be coupled to the interconnect 1105 for communicating information and/or command selections to the processors 1110. In various implementations, the input device 1145 may be a keyboard, a keypad, a touch screen and stylus, a voice activated system, or other input device, or combinations of such devices. Another type of user input device that may be included is a cursor control device 1150, such as a mouse, a trackball, or cursor direction keys for communicating direction information and command selections to the one or more processors 1110 and for controlling cursor movement on the display 1140.

One or more transmitters or receivers 1155 may also be coupled to the interconnect 1105. In some embodiments the device 1100 may include one or more ports 1180 for the reception or transmission of data. Data that may be received or transmitted may include 3D or mono content data 1185. In some embodiments, 3D content data may be transmitted to a format conversion apparatus or element 1190 for transformation into mono content data, and in some embodiments mono content data may be received from a format conversion apparatus or element 1190, the format conversion apparatus or elements 1190 having converted 3D content data into mono content data In addition, the device 1100 may include a USB (Universal Serial Bus) 1170 for reception or transmission of data.

The device 1100 may further include one or more antennas 1158 for the reception of data via radio signals. The device 1100 may also comprise a power device or system 1160, which may comprise a power supply, a battery, a solar cell, a fuel cell, or other system or device for providing or generating power. The power provided by the power device or system 1160 may be distributed as required to elements of the device 1100.

In the description above, for the purposes of explanation, numerous specific details are set forth in order to provide a thorough understanding of the present invention. It will be apparent, however, to one skilled in the art that the present invention may be practiced without some of these specific details. In other instances, well known structures and devices are shown in block diagram form. There may be intermediate structure between illustrated components. The components described or illustrated herein may have additional inputs or outputs which are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. A method comprising:
   receiving a data stream including a plurality of data frames, the data stream being in a first mode having a plurality of channels of content data including a first channel sent in a first position in each data frame and a second channel sent in a second position in each data frame following the first position, each data frame including a synchronization signal indicating a start of the content data;
   transforming the data stream into a plurality of data sub-streams in a second mode, the plurality of data sub-streams including a first data sub-stream to carry data for the first channel in the second mode and a second data sub-stream to carry data for the second channel in the second mode, wherein transforming the data stream into the plurality of data sub-streams includes:
   generating the first data sub-stream by stripping the second channel from each frame of data, and
   generating the second data sub-stream by stripping the first channel and the synchronization signal from each frame and inserting a substitute synchronization signal before the second channel data in each data frame; and
   transmitting the first data sub-stream via a first link in the second mode and the second data sub-stream via a second link in the second mode.

2. The method of claim 1, wherein the content data includes video data.

3. The method of claim 2, wherein the content data in the first mode includes three-dimensional (3D) video data and the content data in the second mode includes mono video data.

4. The method of claim 3, wherein the first channel comprises data for either a left or right channel and the second channel comprises data for the other left or right channel.

5. The method of claim 3, further comprising combining the data of the first sub-stream and the data of the second sub-stream to generate a 3D video image.

6. The method of claim 1, wherein the first data sub-stream and the second data sub-stream are unrelated data sub-streams that were encapsulated together as the data stream.

7. The method of claim 1, wherein transmitting the first and second data streams comprises transmitting the first data stream to a first receiver compatible with the second mode and transmitting the second data stream to a second receiver compatible with the second mode.

8. The method of claim 1, further comprising detecting a type signal prior to a first data frame of the data stream, the type signal indicating that the data stream is of the first type.

9. The method of claim 1, wherein generating the first data sub-stream further comprises inserting non-content data in the first data sub-stream to fill the space previously occupied by the data of the second channel in the data stream.

10. The method of claim 1, wherein generating the second data sub-stream further comprises inserting non-content data in the second data sub-stream to fill the space previously occupied by the synchronization signal and the data of the first channel in the data stream.

11. An apparatus comprising:
- an input port to receive a data stream comprising a plurality of data frames, the data stream being in a first mode having a plurality of channels of content data including a first channel sent in a first position in each data frame and a second channel transmitted in a second position in each data frame following the first position, each data frame including a synchronization signal indicating a start of the content data;
- a memory to hold data for processing;
- a first output port to provide a first data sub-stream to carry data for the first channel in the second mode;
- a second output port to provide a second data sub-stream to carry data for the second channel in the second mode; and
- a processing unit to process the data packets, wherein the processing of the data by the processing unit includes:
  - generating the first data sub-stream by stripping the second channel from each frame of data, and
  - generating the second data sub-stream by stripping the first channel and the synchronization signal from each frame and inserting a substitute synchronization signal before the second channel data in each data frame.

12. The apparatus of claim 11, wherein the apparatus comprises a computer chip.

13. The apparatus of claim 11, wherein the apparatus is a separate unit.

14. The apparatus of claim 11, wherein the apparatus comprises a portion of a transmitting or receiving device.

15. The apparatus of claim 11, wherein the content data includes video data.

16. The apparatus of claim 15, wherein the content data in the first mode includes three-dimensional (3D) video data and the content data in the second mode includes mono video data.

17. The apparatus of claim 16, wherein the first channel comprises data for either a left or right channel and the second channel comprises data for the other left or right channel.

18. The apparatus of claim 11, wherein the first data sub-stream and the second data sub-stream are unrelated data sub-streams that were encapsulated together as the data stream.

19. The apparatus of claim 11, wherein the processing of the data by the processing unit further includes the processing unit inserting non-content data in the first data sub-stream to fill the space previously occupied by the data of the second channel in the data stream.

20. The apparatus of claim 11, wherein the processing of the data by the processing unit further includes the processing unit inserting non-content data in the second data sub-stream to fill the space previously occupied by the synchronization signal and the data of the first channel in the data stream.

21. An system comprising:
- a source device to transmit a data stream comprising a plurality of data frames, the data stream being in a first mode having a plurality of channels of content data including a first channel sent in a first position in each data frame and a second channel transmitted in a second position in each data frame following the first position, each data frame including a synchronization signal indicating a start of the content data;
- a sink device to receive data in a second mode, data in the second mode having a single channel of content data; and
- a format conversion element to convert the data stream in the first mode into a plurality of data sub-streams in the second mode, the conversion of the data stream in the first mode including:
  - generating a first data sub-stream by stripping the second channel from each frame of data, and
  - generating a second data sub-stream by stripping the first channel and the synchronization signal from each frame and inserting a substitute synchronization signal before the second channel data in each data frame.

22. The system of claim 21, wherein the format conversion element comprises a separate unit from the source device and sink device.

23. The system of claim 21, wherein the format conversion element comprises a part of the source device or the sink device.

24. The system of claim 21, wherein the content data includes video data.

25. The system of claim 24, wherein the content data in the first mode includes three-dimensional (3D) video data and the content data in the second mode includes mono video data.

26. The system of claim 21, wherein the first data sub-stream and the second data sub-stream are unrelated data sub-streams that were encapsulated together as the data stream.

27. A computer-readable medium having stored thereon data representing sequences of instructions that, when executed by a processor, cause the processor to perform operations comprising:
- receiving a data stream including a plurality of data frames, the data stream being in a first mode having a plurality of channels of content data including a first channel sent in a first position in each data frame and a second channel sent in a second position in each data frame following the first position, each data frame including a synchronization signal indicating a start of the content data;
- transforming the data stream into a plurality of data sub-streams in a second mode, the plurality of data sub-streams including a first data sub-stream to carry data for the first channel in the second mode and a second data sub-stream to carry data for the second channel in the second mode, wherein transforming the data stream into the plurality of data sub-streams includes:
  - generating the first data sub-stream by stripping the second channel from each frame of data, and
  - generating the second data sub-stream by stripping the first channel and the synchronization signal from each frame and inserting a substitute synchronization signal before the second channel data in each data frame; and
- transmitting the first data sub-stream via a first link in the second mode and the second data sub-stream via a second link in the second mode.

* * * * *